(12) United States Patent
Ohmori

(10) Patent No.: US 10,726,635 B2
(45) Date of Patent: Jul. 28, 2020

(54) THREE-DIMENSIONAL SHAPE DATA EDITING APPARATUS, THREE-DIMENSIONAL MODELING APPARATUS, THREE-DIMENSIONAL MODELING SYSTEM, AND NON-TRANSITORY COMPUTER READABLE MEDIUM STORING THREE-DIMENSIONAL SHAPE DATA EDITING PROGRAM

(71) Applicant: FUJI XEROX CO., LTD., Tokyo (JP)

(72) Inventor: Yuji Ohmori, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 32 days.

(21) Appl. No.: 16/049,834

(22) Filed: Jul. 31, 2018

(65) Prior Publication Data

US 2019/0311547 A1 Oct. 10, 2019

(30) Foreign Application Priority Data

Apr. 5, 2018 (JP) .................................. 2018-073396

(51) Int. Cl.
  *G06T 19/20* (2011.01)
(52) U.S. Cl.
  CPC ...... *G06T 19/20* (2013.01); *G06T 2219/2021* (2013.01)

(58) Field of Classification Search
  None
  See application file for complete search history.

(56) References Cited

U.S. PATENT DOCUMENTS

| 5,858,297 | A | * | 1/1999 | Ozawa | ................. | B29C 64/135 |
| | | | | | | 264/401 |
| 2016/0129632 | A1 | * | 5/2016 | Yamazaki | ............ | B29O 64/386 |
| | | | | | | 425/132 |
| 2017/0336777 | A1 | * | 11/2017 | Koh | ..................... | G05B 19/4099 |
| 2018/0268616 | A1 | * | 9/2018 | Choi | ..................... | B33Y 50/00 |
| 2019/0001576 | A1 | * | 1/2019 | Eller | ..................... | B29C 64/106 |

FOREIGN PATENT DOCUMENTS

| JP | H0885155 | 4/1996 |
| JP | 2017094626 | 6/2017 |

* cited by examiner

*Primary Examiner* — Kyle Zhai
(74) *Attorney, Agent, or Firm* — JCIPRNET

(57) ABSTRACT

A three-dimensional shape data editing apparatus includes an editing unit that edits three-dimensional shape data so that a three-dimensional shape represented by using a voxel having a height of a lamination interval is similar to an original three-dimensional shape represented by the three-dimensional shape data in a case where the height of the voxel in a lamination direction of the three-dimensional shape data representing the three-dimensional shape by a set of plural voxels is different from the lamination interval of a three-dimensional modeling apparatus that models the three-dimensional shape.

20 Claims, 12 Drawing Sheets

FIG. 8
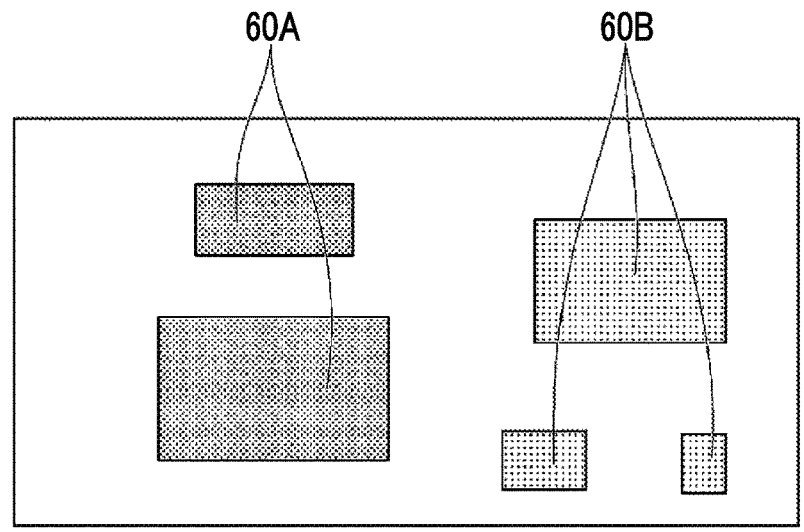
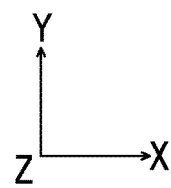
FIG. 9
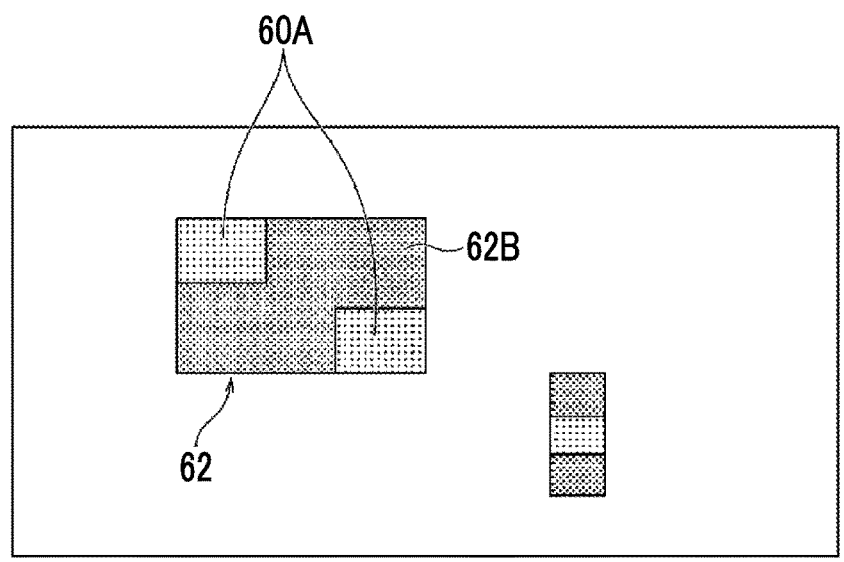
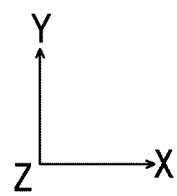

FIG. 18
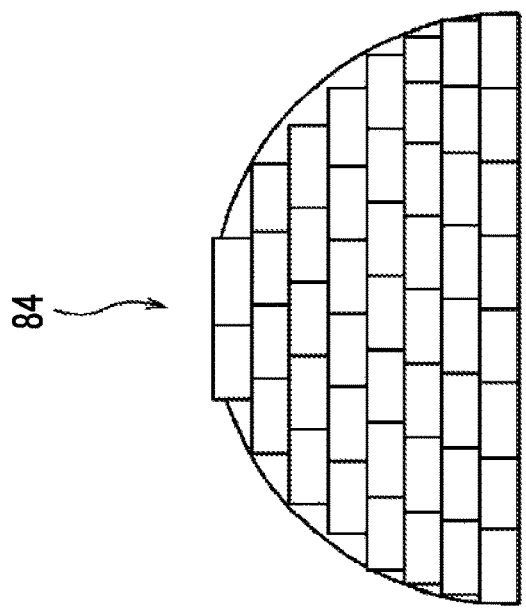
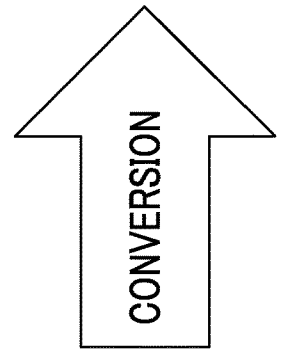
CONVERSION
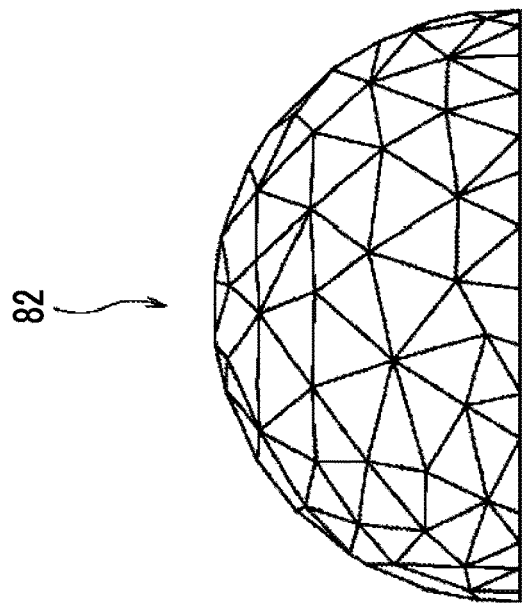

US 10,726,635 B2

THREE-DIMENSIONAL SHAPE DATA EDITING APPARATUS, THREE-DIMENSIONAL MODELING APPARATUS, THREE-DIMENSIONAL MODELING SYSTEM, AND NON-TRANSITORY COMPUTER READABLE MEDIUM STORING THREE-DIMENSIONAL SHAPE DATA EDITING PROGRAM

CROSS-REFERENCE TO RELATED APPLICATIONS

This application is based on and claims priority under 35 USC 119 from Japanese Patent Application No. 2018-073396 filed Apr. 5, 2018.

BACKGROUND

(i) Technical Field

The present invention relates to a three-dimensional shape data editing apparatus, a three-dimensional modeling apparatus, a three-dimensional modeling system, and a non-transitory computer readable medium storing a three-dimensional shape data editing program.

(ii) Related Art

JP1996-085155A discloses an optical modeling apparatus that scans a liquid surface of a UV curing resin with a laser beam according to shape data, cures a portion irradiated with the laser beam, and sequentially laminates the cured layer to produce a shape model. The optical modeling apparatus includes a focus control section capable of varying a focus state of the laser beam on the liquid surface of the UV curing resin and a control section capable of varying a laser power. The focus control section controls a focus so that the focus is shifted in a just focus direction rather than a defocus state in a case where a lamination pitch is large and the focus is in the defocus state in a case where the lamination pitch is small according to magnitude of the lamination pitch, or the laser power control section increases or decreases the laser power as necessary.

JP2017-094626A discloses a three-dimensional object modeling apparatus that includes a head unit which ejects a liquid for forming a dot and a modeling control unit which controls modeling of a three-dimensional object by the cured dot. The head unit ejects the liquid so as to form dots of plural sizes including a first dot of a first size and a second dot of a second size different from the first size. The modeling control unit controls the modeling of the three-dimensional object so that the second dot is included in the dots adjacent to the first dot disposed inside the three-dimensional object.

SUMMARY

Aspects of non-limiting embodiments of the present disclosure relate to a three-dimensional shape data editing apparatus, a three-dimensional modeling apparatus, a three-dimensional modeling system, and a non-transitory computer readable medium storing a three-dimensional shape data editing program capable of reducing degradation of reproducibility of three-dimensional shape, as compared with a case where a height of a voxel in a lamination direction is simply switched into a lamination interval of the three-dimensional modeling apparatus, in a case where the height of the voxel in the lamination direction of the three-dimensional shape data representing the three-dimensional shape by a set of a plurality of voxels is different from the lamination interval of the three-dimensional modeling apparatus that models the three-dimensional shape.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided a three-dimensional shape data editing apparatus including: an editing unit that, in a case where a height of a voxel in a lamination direction of three-dimensional shape data representing a three-dimensional shape by a set of a plurality of voxels is different from a lamination interval of a three-dimensional modeling apparatus that models the three-dimensional shape, edits the three-dimensional shape data so that the three-dimensional shape represented by using the voxel having the height of the lamination interval is similar to an original three-dimensional shape represented by the three-dimensional shape data.

BRIEF DESCRIPTION OF THE DRAWINGS

Exemplary embodiment(s) of the present invention will be described in detail based on the following figures, wherein:

FIG. 8 is a plan view illustrating an example of a modeling area;

FIG. 9 is a plan view illustrating another example of a modeling area;

FIG. 18 is a diagram illustrating a case where data such as an STL format is switched into voxel data;

DETAILED DESCRIPTION

Hereinafter, exemplary embodiments of the present invention will be described in detail with reference to the accompanying drawings.

Figure 1:
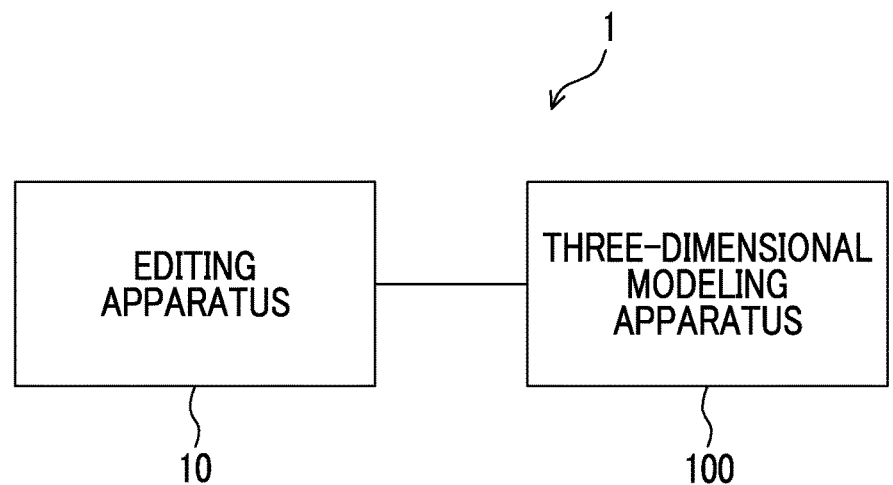
FIG. 1 is a configuration diagram of a three-dimensional modeling system.

FIG. 1 is a configuration diagram of a three-dimensional modeling system 1 according to the present exemplary embodiment. As illustrated in FIG. 1, the three-dimensional modeling system 1 includes a three-dimensional shape data editing apparatus 10 and a three-dimensional modeling apparatus 100.

Figure 2:
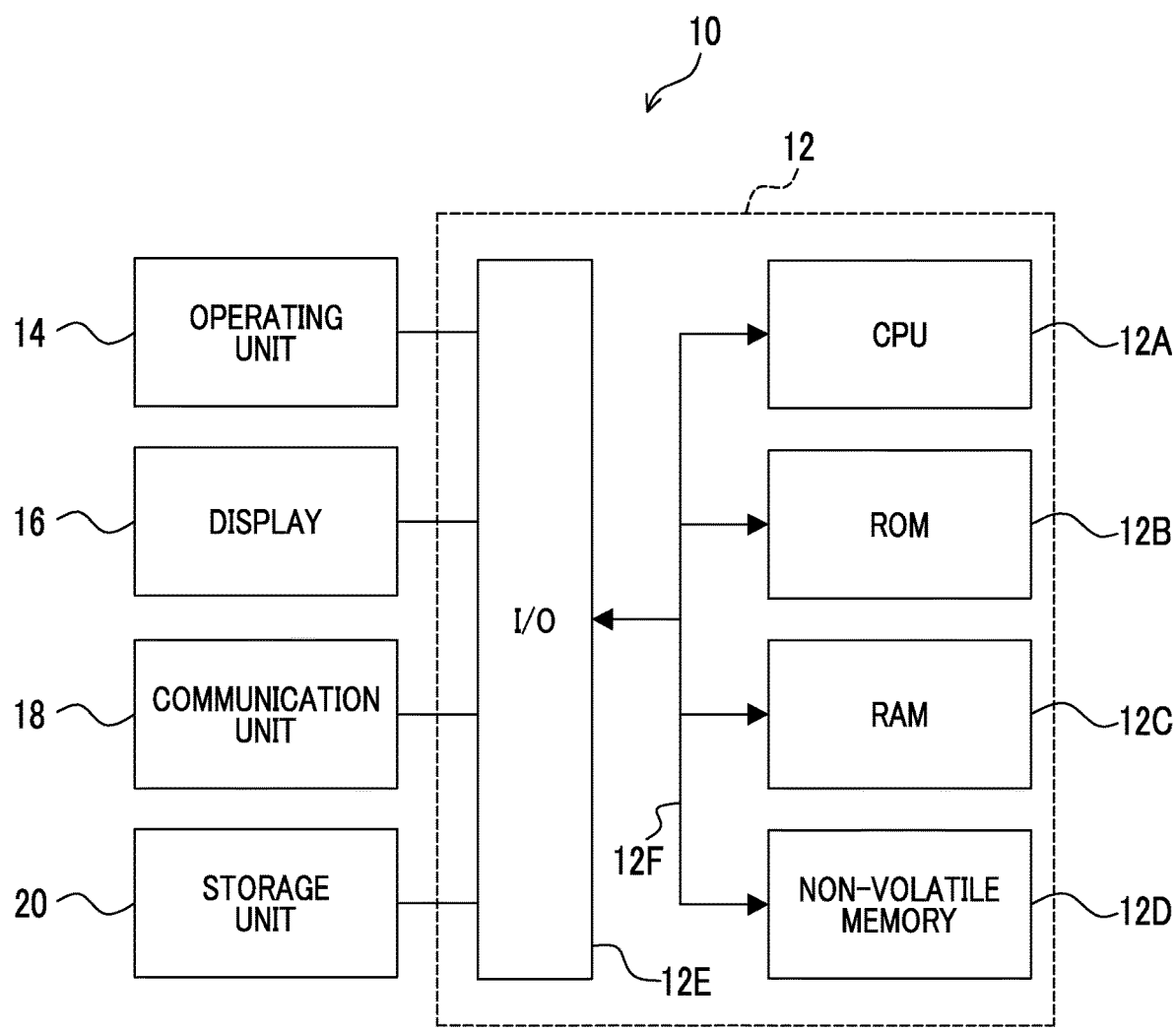
FIG. 2 is a configuration diagram of a three-dimensional shape data editing apparatus.

Next, a configuration of the three-dimensional shape data editing apparatus 10 according to the present exemplary embodiment will be described with reference to FIG. 2.

The editing apparatus 10 is configured with, for example, a personal computer and includes a controller 12. The controller 12 includes a central processing unit (CPU) 12A, a read only memory (ROM) 12B, a random access memory (RAM) 12C, a non-volatile memory 12D, and an input/output interface (I/O) 12E as an example of an editing unit. The CPU 12A, the ROM 12B, the RAM 12C, the non-volatile memory 12D, and the I/O 12E are connected with one another via a bus 12F.

In addition, an operating unit 14, a display unit 16, a communication unit 18, and a storage unit 20 are connected to the I/O 12E. The CPU 12A is an example of a generating unit or a modifying unit.

The operating unit 14 is configured to include an input device such as a mouse, a keyboard, a touch panel, and the like for receiving an instruction from a user of the editing apparatus 10.

The display unit 16 is configured to include a display device such as a liquid crystal display, an organic electro luminescence (EL) display, and the like.

The communication unit 18 includes an interface for performing data communication with the three-dimensional modeling apparatus 100. In addition, the communication unit may include an interface which is connected to, for example, an internet or a local area network (LAN) and performs data communication with an external device such as a personal computer connected to the communication line.

The storage unit 20 is configured with a non-volatile storage device such as a hard disc and stores a three-dimensional shape data editing program, three-dimensional shape data, support material data, and the like described below. The CPU 12A reads and executes the three-dimensional shape data editing program stored in the storage unit 20.

Figure 3:
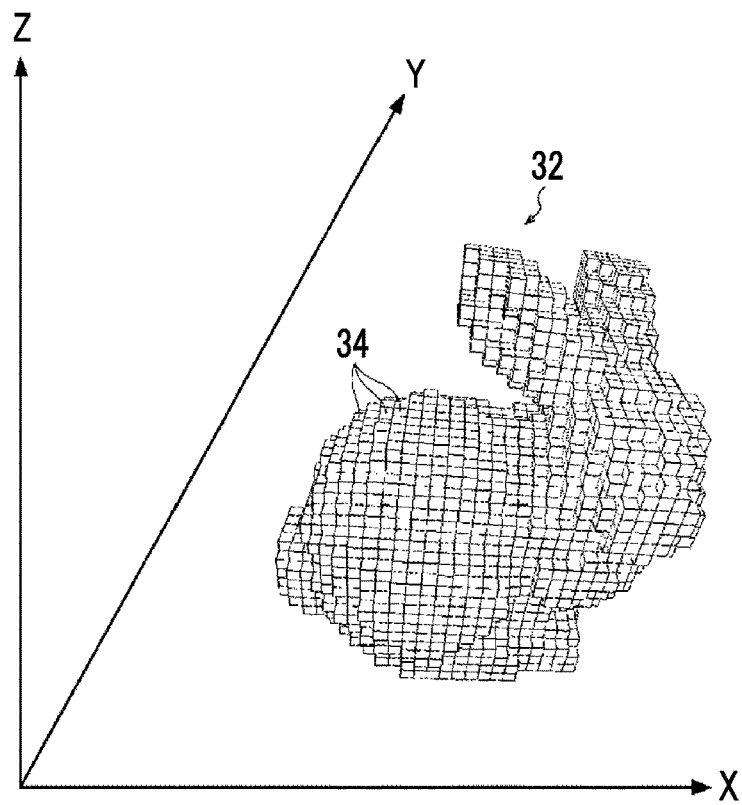
FIG. 3 is a diagram illustrating an example of a three-dimensional shape.

FIG. 3 is a diagram illustrating an example of a three-dimensional shape 32 displayed by three-dimensional shape data. As illustrated in FIG. 3, the editing apparatus 10 displays the three-dimensional shape 32 by using a three-dimensional coordinate space represented by orthogonal X, Y and Z axes.

In the present exemplary embodiment, a case of expressing the three-dimensional shape 32 by using a set of voxels 34 as a data format of the three-dimensional shape data will be described, but another data format may be used for expressing the three-dimensional shape 32. Hereinafter, in some cases, the three-dimensional shape data in a data format in which the three-dimensional shape is expressed by the set of the voxels, is referred to as voxel data.

Here, the voxel 34 is a basic element of the three-dimensional shape 32 and, for example, a rectangular parallelepiped is used, but the voxel 34 is not limited to the rectangular parallelepiped and a sphere, a cylinder, or the like may be used. By stacking the voxels 34, the desired three-dimensional shape 32 is expressed. In addition, attribute information indicating properties of the voxel 34 such as color, intensity, material, texture, and the like is designated in each of the voxels 34 and depending on the presence or absence of the voxel 34 and the attribute information of the voxel 34, the color, the material, and the like of the three-dimensional shape 32 are expressed.

As described above, the three-dimensional shape 32 is displayed by the set of the voxels 34, specifically, displayed by, for example, an element value n in X, Y, and Z coordinates in the three-dimensional coordinate space. Here, n is an integer equal to or greater than 0. In a case where the coordinates in the three-dimensional coordinate space are represented by (X, Y, Z) and in a case where the voxel 34 exists the coordinates (X, Y, Z), n is set to an integer equal to or greater than 1. On the other hand, in a case where the voxel 34 does not exist in the coordinates (X, Y, Z), n is set to 0. Accordingly, the three-dimensional shape 32 is displayed.

In a case where n is equal to or larger than 1, n represents an attribute of the voxel. For example, in a case where n=2, n indicates that a material of the voxel is A and a color of the voxel is red, and in a case where n=3, n indicates that a material is B, a color is green, and the like. That is, a value of n corresponds to the attribute of the voxel one to one.

In addition, a shape of the three-dimensional shape 32 is not limited thereto. As long as the shape is expressed by using the three-dimensional shape data, the shape may be any shape.

As a three-dimensional modeling method for modeling the three-dimensional shape, for example, a fused deposition modeling method (FDM) for modeling the three-dimensional shape by melting and laminating a thermoplastic resin, a stereolithography, and the like are used, but the method is not limited thereto.

Next, the three-dimensional modeling apparatus of modeling the three-dimensional shape by using the three-dimensional shape data generated by the three-dimensional shape data editing apparatus 10 will be described.

Figure 4:
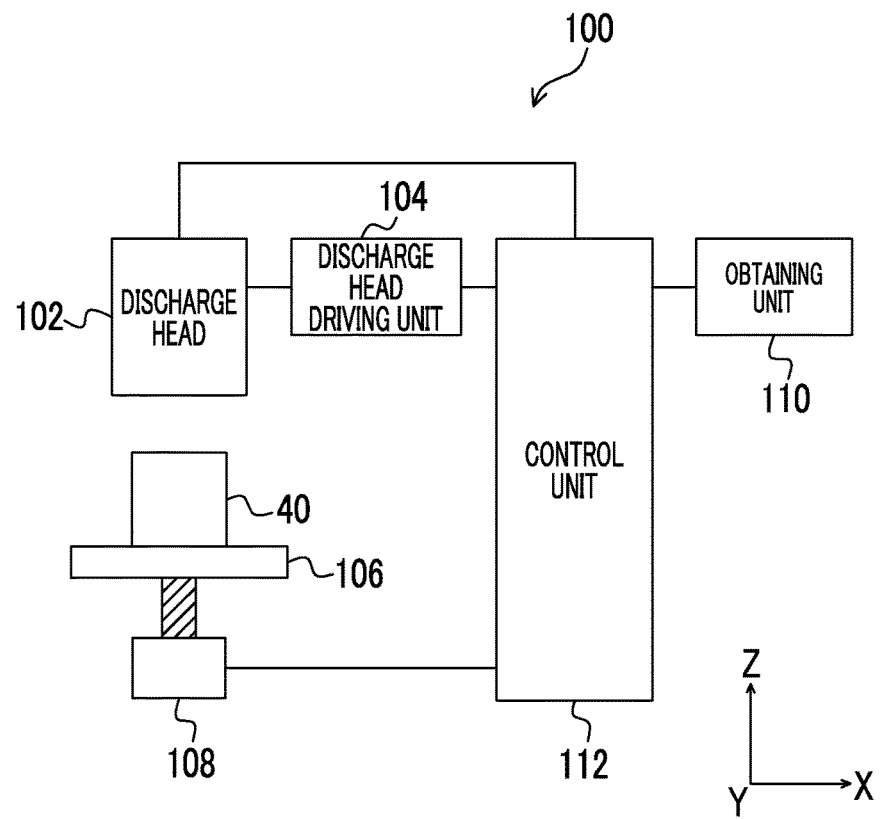
FIG. 4 is a configuration diagram of a three-dimensional modeling apparatus.

FIG. 4 illustrates a configuration of the three-dimensional modeling apparatus 100 according to the present exemplary embodiment. As illustrated in FIG. 4, the three-dimensional modeling apparatus 100 includes a discharge head 102, a discharge head driving unit 104, a modeling table 106, a modeling table driving unit 108, an obtaining unit 110, and a control unit 112. The discharge head 102, the discharge head driving unit 104, the modeling table 106, and the modeling table driving unit 108 are examples of modeling units.

The discharge head 102 includes a modeling material discharge head of discharging a modeling material for modeling a three-dimensional shape 40 and a support material discharge head of discharging a support material. The support material is used for supporting an overhang portion (also referred to as "projecting portion") of the three-dimensional shape until modeling is completed and is removed after the modeling is completed.

The discharge head driving unit 104 drives the discharge head 102 and the discharge head 102 two-dimensionally performs scanning on an XY plane.

The modeling table driving unit 108 drives the modeling table 106 and the modeling table 106 is moved up and down in the Z-axis direction.

The obtaining unit 110 obtains the three-dimensional shape data and the support material data generated by the three-dimensional shape data editing apparatus 10.

The control unit 112 causes the discharge head 102 to two-dimensionally perform the scanning by driving the discharge head driving unit 104 and controls the discharge of the modeling material and the support material by the discharge head 102 so that the modeling material is discharged according to the three-dimensional shape data obtained by the obtaining unit 110 and the support material is discharged according to the support material data.

In addition, every time the modeling of each of layers is completed, the control unit 112 drives the modeling table driving unit 108 to lower the modeling table 106 by a predetermined lamination interval.

Figure 5:
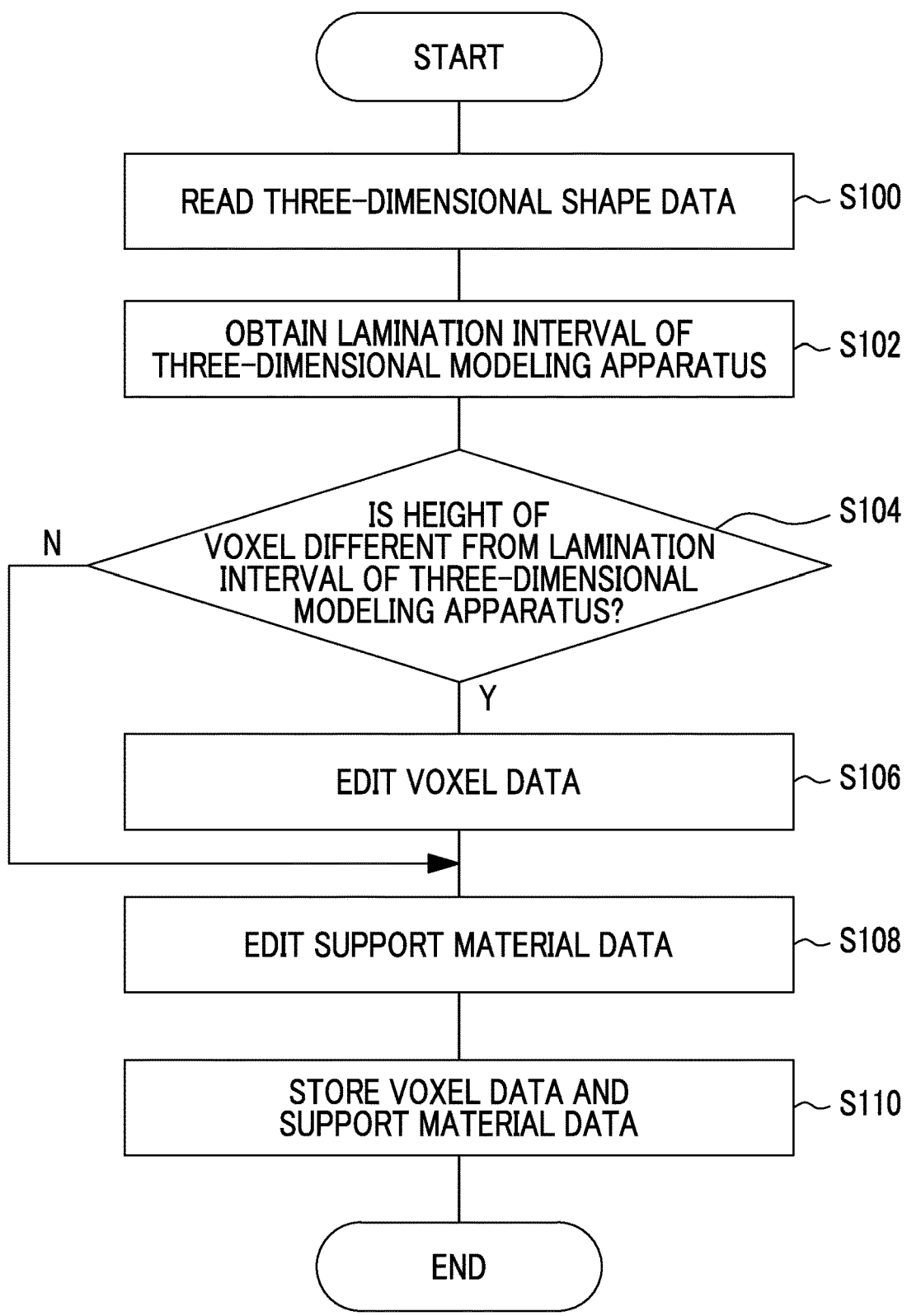
FIG. 5 is a flowchart illustrating a flow of a process by a three-dimensional shape data editing program.

Next, an action of the editing apparatus 10 according to the present exemplary embodiment will be described with reference to FIG. 5. An editing process illustrated in FIG. 5 is executed by the CPU 12A reading and executing the three-dimensional shape data editing program. The editing process illustrated in FIG. 5 is executed, for example, in a case where an operation of the user instructs to execute the editing program.

In step S100, the voxel data as the three-dimensional shape data is read from the storage unit 20.

In step S102, the lamination interval in a case where the three-dimensional modeling apparatus 100 models the three-dimensional shape, is obtained. For example, by requesting the three-dimensional modeling apparatus 100 to transmit the lamination interval, the lamination interval transmitted from the three-dimensional modeling apparatus 100 is received and obtained.

In step S104, it is determined whether or not a height of the voxel displayed by the voxel data read in step S100, in the lamination direction is different from the lamination interval of the three-dimensional modeling apparatus 100 obtained in step S102.

In some cases, the voxel data may include plural types of the voxels having different heights in the lamination direction. In addition, the three-dimensional modeling apparatus 100 may have different heights in the lamination direction corresponding to plural different lamination intervals in a case of modeling the three-dimensional shape. For this reason, in step S104, in a case where the voxel data read in step S100 includes plural voxels having different heights in the lamination direction and a case where at least one voxel having the height in the lamination direction is not equal to the lamination interval of the three-dimensional modeling apparatus 100, exist in the voxel data, among plural voxels, the determination in step S104 is negative. In other words, in a case where all of the heights of plural voxels in the lamination direction are equal to the lamination interval of the three-dimensional modeling apparatus 100, the determination in step S104 is positive.

In a case where the determination in step S104 is positive, the process moves to step S106 and in a case where the determination in step S104 is negative, the process moves to step S108.

In step S106, the voxel data is edited so that the three-dimensional shape displayed by using the voxel having the height with the lamination interval of the three-dimensional modeling apparatus 100 is similar to the original three-dimensional shape displayed by the voxel data.

Figure 6:
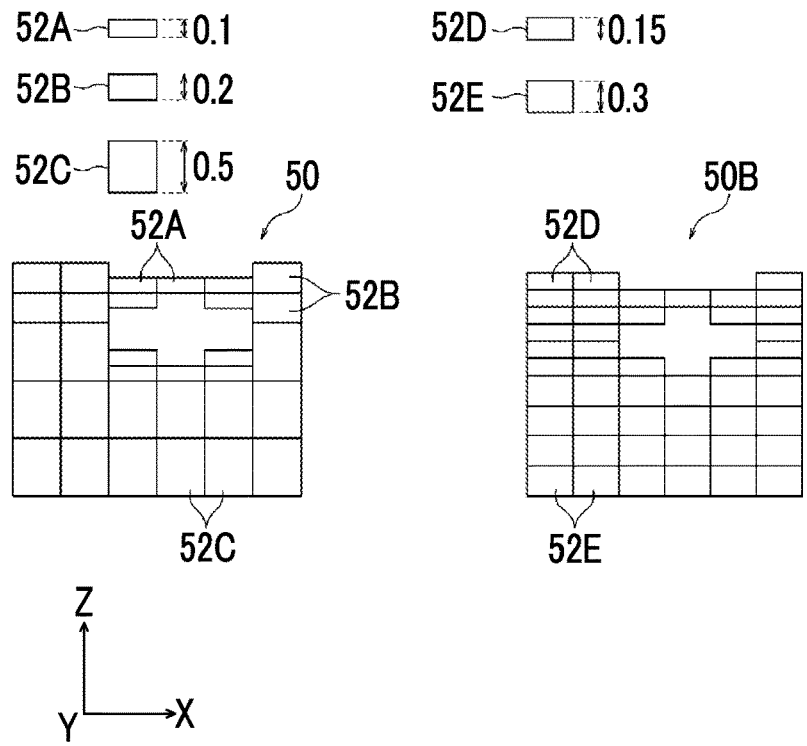
FIG. 6 is a diagram illustrating an example of the three-dimensional shape expressed by a voxel.

For example, a case where the three-dimensional shape displayed by the voxel data read in step S100, is a three-dimensional shape 50 illustrated in FIG. 6 will be described. The three-dimensional shape 50 is configured with three types of the voxels 52A to 52C having different heights in the lamination direction (Z direction in FIG. 6). Here, as an example, the height of the voxel 52A in the lamination direction is 0.1, the height of the voxel 52B is 0.2, and the height of the voxel 52C is 0.5. A case where the three-dimensional modeling apparatus 100 has two types of the lamination intervals of 0.15 and 0.3 and the voxels 52A to 52C are converted into voxels close to the lamination interval of the three-dimensional modeling apparatus 100, is considered.

Figure 7:
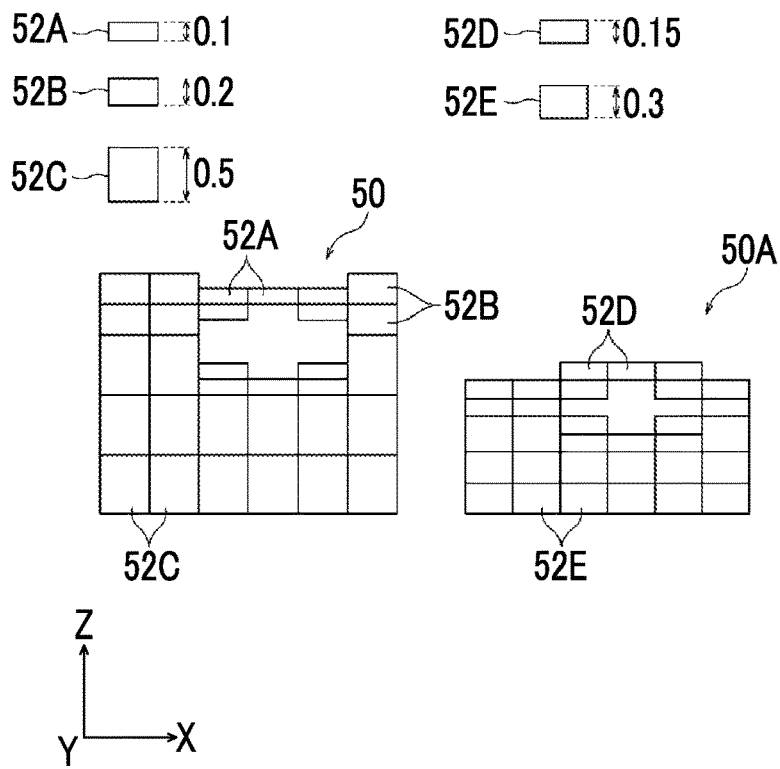
FIG. 7 is a diagram illustrating another example of the three-dimensional shape expressed by the voxel.

For example, the height of 0.1 of the voxel 52A in the lamination direction and the height of 0.2 of the voxel 52B in the lamination direction are close to 0.15 of the lamination intervals of 0.15 and 0.3 of the three-dimensional modeling apparatus 100. For this reason, the heights of the voxels 52A and 52B in the lamination direction are converted into a voxel 52D of 0.15. In addition, the height of 0.5 of the voxel 52C in the lamination direction is close to 0.3 of the lamination intervals of 0.15 and 0.3 of the three-dimensional modeling apparatus 100. For this reason, the height of the voxel 52C in the lamination direction is converted into a voxel 52E of 0.3. In this case, as illustrated in FIG. 7, a three-dimensional shape 50A after the conversion of the three-dimensional shape 50 has a shape significantly different from the original three-dimensional shape 50.

In this way, in a case where the height of the voxel in the lamination direction is simply converted into the lamination interval of the three-dimensional modeling apparatus 100 with the identical number of voxels, the three-dimensional shape 50A is different from the original three-dimensional shape 50 in some cases.

The voxel is converted into the voxel having the height close to the lamination interval among plural lamination intervals of the three-dimensional modeling apparatus 100 and the number of voxels in the lamination direction is adjusted so that the three-dimensional shape 50A is similar to the original three-dimensional shape. Accordingly, for example, as illustrated in FIG. 6, the three-dimensional shape 50A is converted into a three-dimensional shape 50B similar to the original three-dimensional shape 50.

As illustrated in FIG. 8, in a case where the three-dimensional shape is viewed in a plan view in the Z-direction, the three-dimensional shape data may be edited so that the lamination intervals are different in plural modeling areas 60A and 60B within an identical layer. In this case, each of the plural modeling areas 60A and 60B may be an area corresponding to each of plural different three-dimensional shapes.

For example, in a case where there are two types of the lamination intervals of 0.1 and 0.2 as the lamination intervals of the three-dimensional modeling apparatus 100, the height of the voxel in the lamination direction in the modeling area 60A may be 0.1 and the height of the voxel in the lamination direction in the modeling area 60B may be 0.2.

In the present exemplary embodiment, as an example, one layer is a layer configured with the smallest lamination interval among plural lamination intervals of the three-dimensional modeling apparatus 100.

In addition, as illustrated in FIG. 9, in a case where the three-dimensional shape is viewed in a plan view in the Z-direction, the three-dimensional shape data may be edited so that the lamination intervals are different in plural partial areas 62A and 62B within the modeling area 62. For example, in a case where there are two types of the lamination intervals of 0.1 and 0.2 as the lamination intervals of the three-dimensional modeling apparatus 100, the height of the voxel in the partial area 62A may be 0.1 and the height of the voxel in the partial area 62B may be 0.2.

Figure 10:
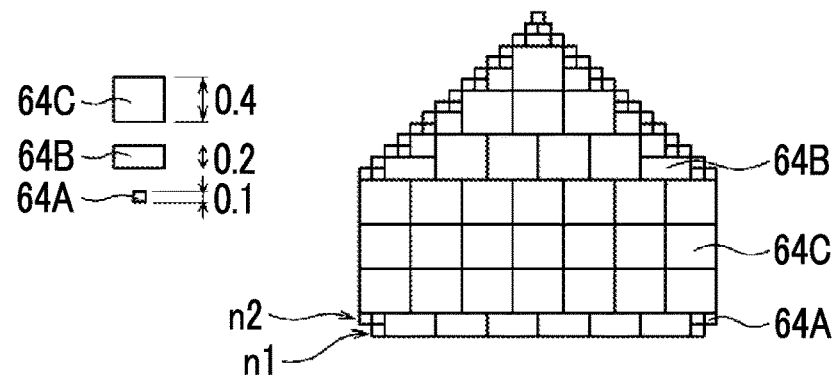
FIG. 10 is a diagram illustrating still another example of the three-dimensional shape expressed by the voxel.

Further, for example, as illustrated in FIG. 10, the voxel data may be edited so as to include the voxels having the different heights within an identical layer. In the example in FIG. 10, there are three types of the voxel 64A having the height of 0.1 in the lamination direction, the voxel 64B having the height of 0.2 in the lamination direction, and the voxel 64C having the height of 0.4 in the lamination direction. Three types means three types of the voxels having the different heights in the lamination direction, and even in a case where the lengths of the voxels in a direction orthogonal to the lamination direction are different but the heights of the voxels in the lamination direction are identical, the voxels are identical types of the voxels. As illustrated in FIG. 10, a first layer n1 and a second layer n2 include the voxel 64A having the height of 0.1 in the lamination direction and the voxel 64B having the height of 0.2 in the lamination direction.

Figure 11:
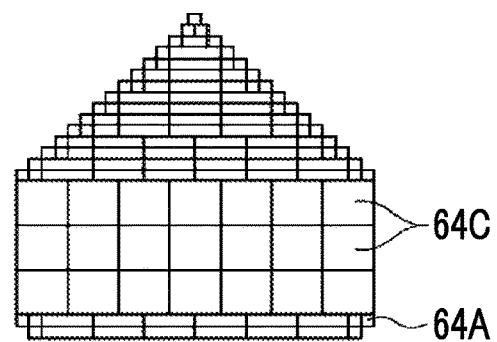
FIG. 11 is a diagram illustrating still another example of the three-dimensional shape expressed by the voxel.

In addition, as illustrated in FIG. 11, the voxel data may be edited so that all of the heights of the voxels within an identical layer are identical, by using the voxel 64A having the height of 0.1 in the lamination direction and the voxel 64C having the height of 0.4 in the lamination direction.

Figure 12:
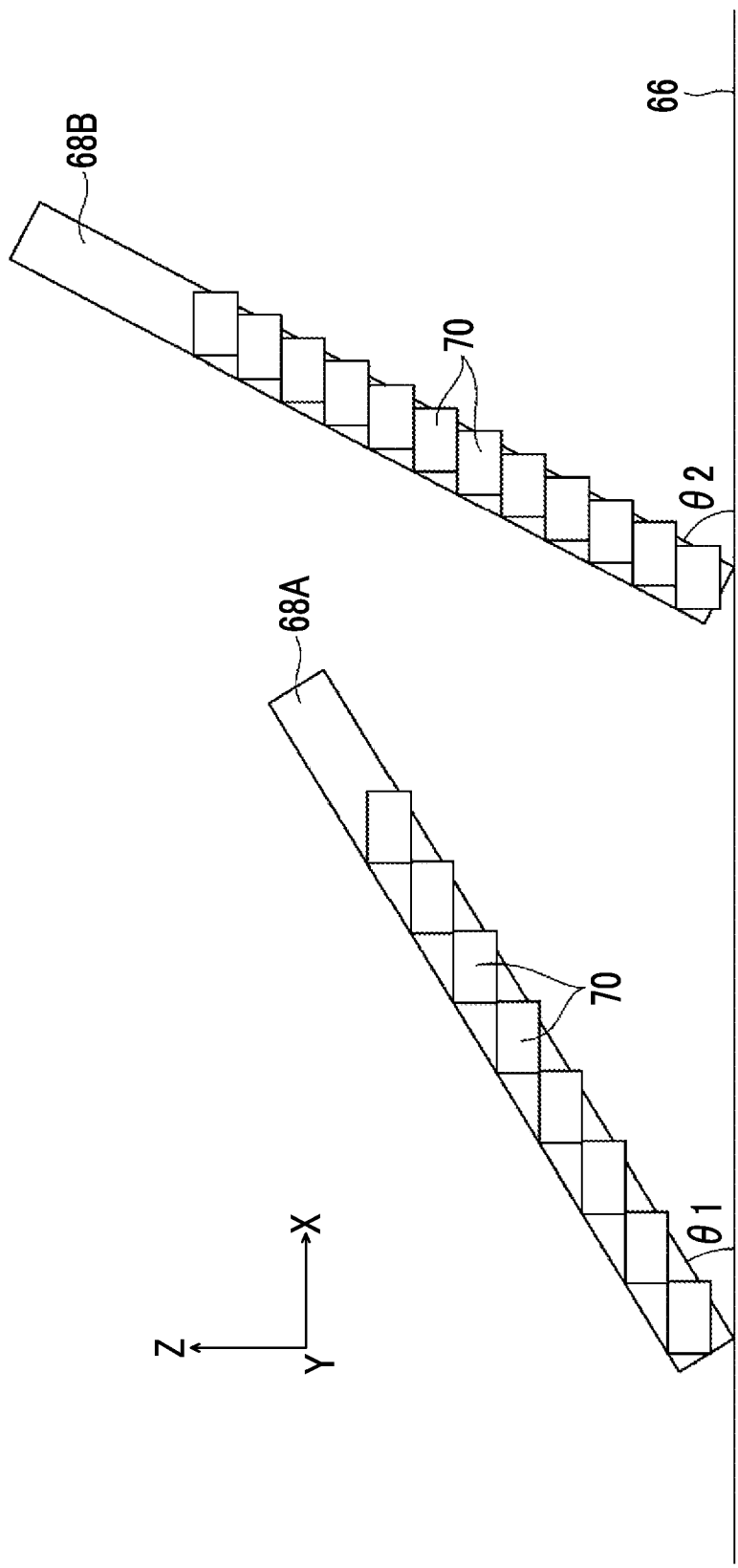
FIG. 12 is a diagram for explaining a level difference between a case where an inclined surface is gentle and a case where the inclined surface is steep.
Figure 13:
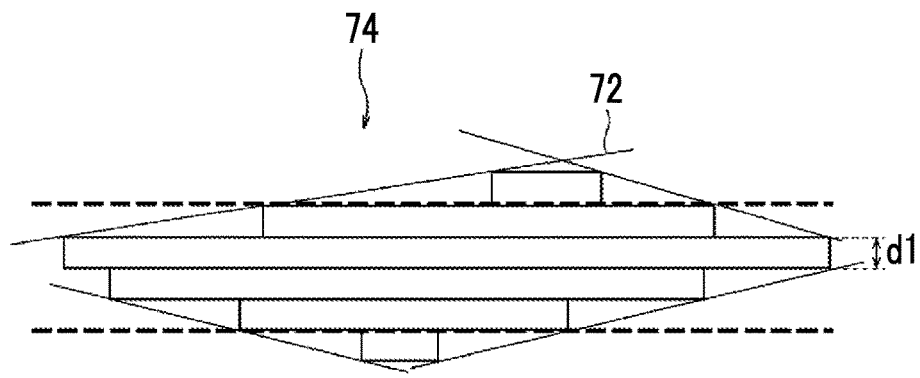
FIG. 13 is a diagram for explaining a level difference between a case where an inclined surface is gentle and a case where the inclined surface is steep.
Figure 14:
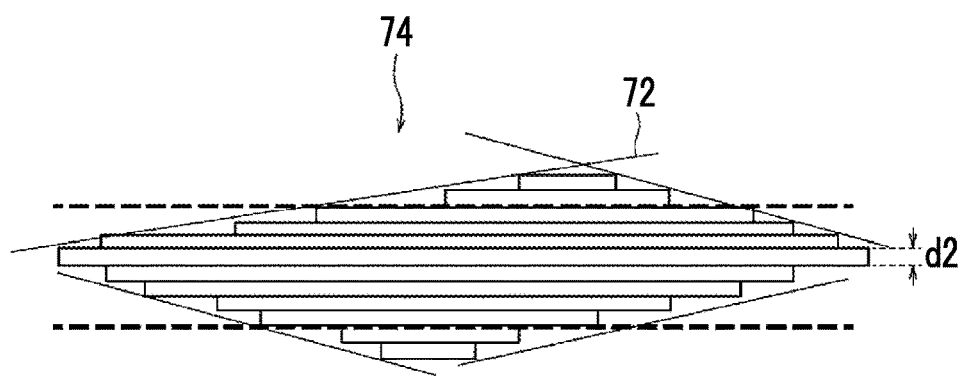
FIG. 14 is a diagram for explaining a level difference between a case where an inclined surface is gentle and a case where the inclined surface is steep.

In addition, an inclined portion, that is, a portion not parallel to the XY plane exists in the three-dimensional shape, for example, as illustrated in FIG. 12, in an inclined surface 68A on which a tilt angle θ1 to an XY plane 66 is relatively gentle and an inclined surface 68B on which a tilt angle θ2 (θ1<θ2) to the XY plane 66 is relatively steep, in a case of using voxels 70 having the identical height, since an overlap of the voxels 70 in the X direction is smaller in the inclined surface 68A than in the inclined surface 68B, a level difference becomes larger. Accordingly, in the inclined portion of the three-dimensional shape, the three-dimensional shape data may be edited so that as the tilt angle decreases, the height of the voxel in the lamination direction decreases. Accordingly, even in a case where the tilt angle θ is gentle, the level difference becomes small. For example, comparing a case where the three-dimensional modeling apparatus 100 models a three-dimensional shape 74 including an gentle inclined surface 72 with a lamination interval d1 as illustrated in FIG. 13 with a case where the three-dimensional modeling apparatus 100 models the three-dimensional shape 74 with a lamination interval d2 (d1>d2) as illustrated in FIG. 14, in the case of the lamination interval d2, the level difference of the inclined surfaces becomes small.

Figure 15:
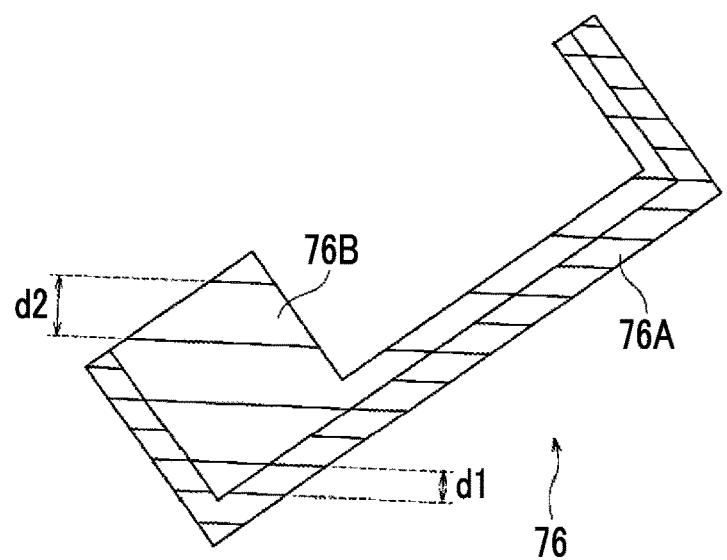
FIG. 15 is a diagram illustrating a difference between heights of voxels in a lamination direction of an external area and an internal area of the three-dimensional shape.

In addition, the three-dimensional shape data may be edited so that the lamination interval of an external area of the three-dimensional shape is different from the lamination interval of an internal area of the three-dimensional shape. For example, as illustrated in FIG. 15, in a case where an area 76A in a three-dimensional shape 76 is an external area which is visually recognized as an appearance or which a person touches and an area 76B in the three-dimensional shape 76 is an internal area which is visually recognized as an appearance or which the person touches, the three-dimensional shape data may be edited so that the lamination interval d1 of the area 76A which is the external area is smaller than the lamination interval d2 of the area 76B which is the internal area. Further, in a case where the internal area of the three-dimensional shape is required to have a smooth shape for metal mold or the like, the three-dimensional shape data may be edited so that the lamination interval of the internal area is smaller than the lamination interval of the external area.

The three-dimensional shape data may be edited so that the lamination interval of a predetermined area required to have a smooth shape in the external area is smaller than the lamination interval of an area other than the predetermined area.

Figure 16:
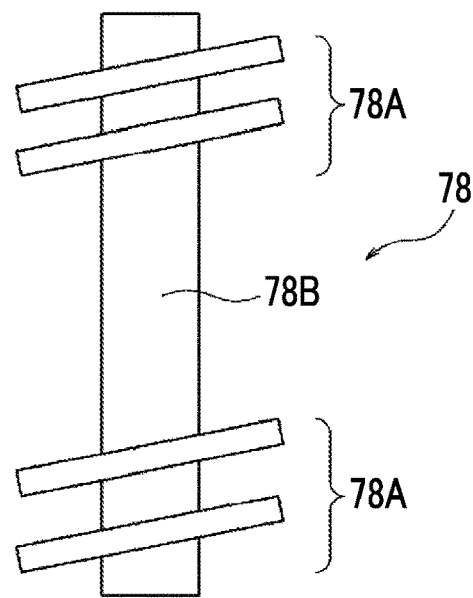
FIG. 16 is a diagram illustrating a lamination interval in a case of modeling a supply member of a toner.

For example, in a case where the three-dimensional shape is a supply member 78 which supplies a toner in an image forming device of an electrophotographic method illustrated in FIG. 16, it is necessary to finish a screw portion 78A smoothly so as to improve transportability of the toner. In this case, the three-dimensional shape data may be edited so that the lamination interval of the screw portion 78A is finer as compared with the lamination interval of a shaft 78B.

Figure 17:
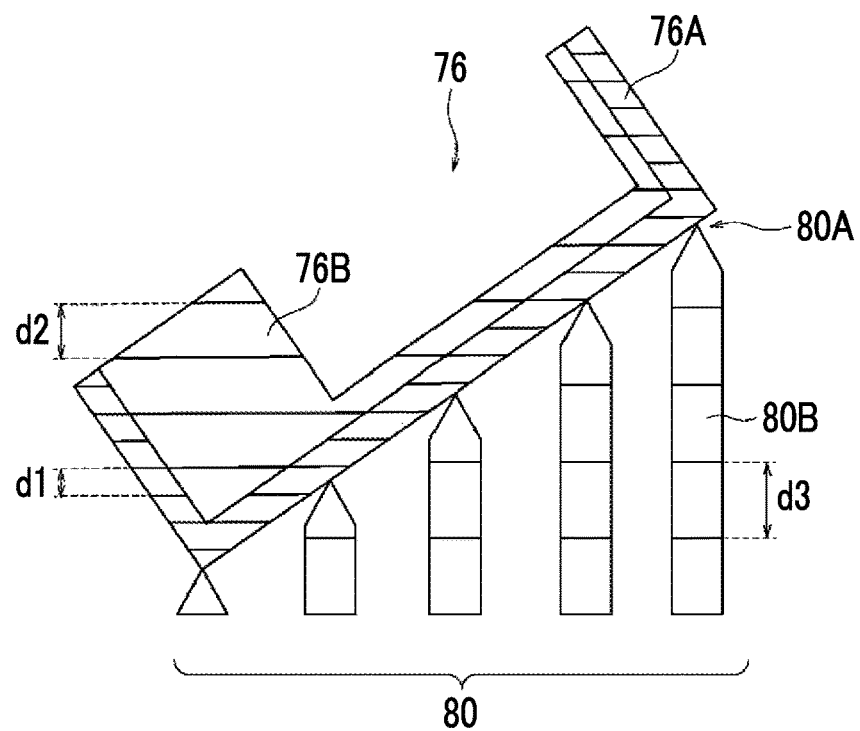
FIG. 17 is a diagram illustrating a lamination interval of a support material.

In step S108, the support material data is edited. For example, as illustrated in FIG. 17, the three-dimensional shape data and the support material data may be edited so that a lamination interval d3 of a support material 80 which supports a three-dimensional shape 76 is larger than the lamination intervals d1 and d2 of the three-dimensional shape 76.

Further, the support material data may be edited so that a shape of a portion 80A in contact with a three-dimensional shape 76 is smaller than an area of a portion 80B not in contact with the three-dimensional shape 76.

In step S110, the voxel data edited in step S106 and the support material data edited in step S108 are stored in the storage unit 20.

In this way, in the present exemplary embodiment, in the case where the height of the voxel in the lamination direction is different from the lamination interval of the three-dimensional modeling apparatus 100, without simply converting the height of the voxel in the lamination direction into the lamination interval of the three-dimensional modeling apparatus 100, the three-dimensional shape data is edited to be similar to the original three-dimensional shape.

In the present exemplary embodiment, although the case of reading and editing the voxel data is described, for example, as illustrated in FIG. 18, a three-dimensional shape data 82 in another format such as an STL format and a CAD data may be received and the received three-dimensional shape data may be converted into voxel data 84. In this case, the three-dimensional shape data may be temporally converted into the voxel data common to various three-dimensional modeling apparatuses, and then the voxel data 84 may be edited based on the lamination interval of the three-dimensional modeling apparatus 100.

By the way, in a case of the stereolithography or the like is used, warping occurs in the three-dimensional shape, the number of three-dimensional shapes modeled at once is increased by tilting and modeling, as a result, the three-dimensional modeling apparatus models the inclined three-dimensional shape not being in parallel with the XY plane in some cases.

Figure 19:
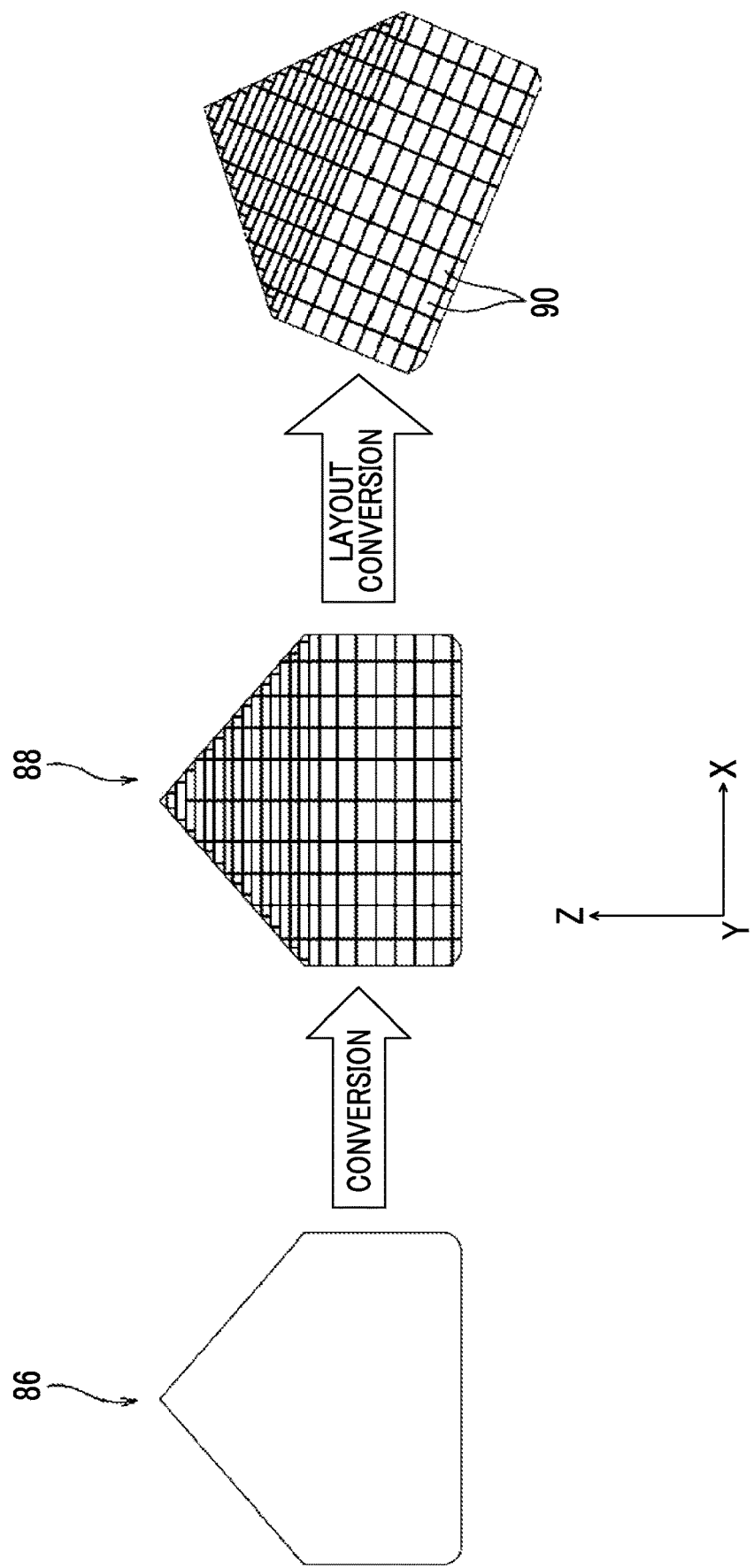
FIG. 19 is a diagram illustrating a case of modeling the three-dimensional shape by tilting the three-dimensional shape.

In this case, as illustrated in FIG. 19, even in a case where the three-dimensional shape represented by a three-dimensional shape data 86 in another format such as an STL format is converted into voxel data 88 in a state in which the three-dimensional shape is parallel to the XY plane and then, a layout of the three-dimensional shape is converted, a voxel 90 is inclined to the XY plane. For this reason, it is difficult for the three-dimensional modeling apparatus 100 to model the three-dimensional shape.

Figure 20:
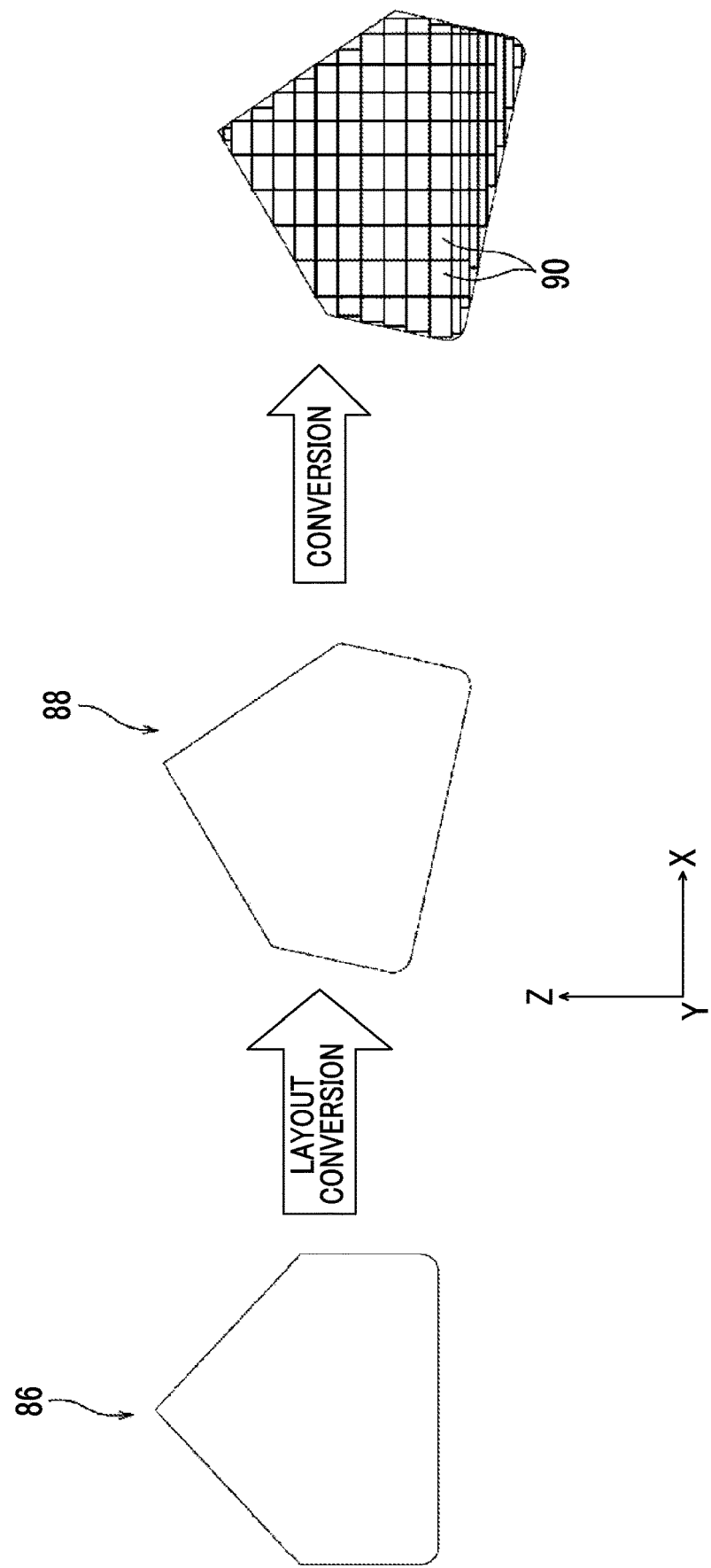
FIG. 20 is a diagram illustrating a case of modeling the three-dimensional shape by tilting the three-dimensional shape.

Therefore, as illustrated in FIG. 20, the three-dimensional shape represented by the three-dimensional shape data in another format may be converted into the voxel data in a state in which the three-dimensional shape is inclined.

Although the present exemplary embodiment of the invention is described by using each of the exemplary embodiments, the present exemplary embodiment of the invention is not limited to the scope described in each of the exemplary embodiments. Various modifications or improvements can be added to each of the exemplary embodiments without departing from the gist of the present exemplary embodiment of the invention and the modified or improved form is also included in the technical scope of the present exemplary embodiment of the invention.

For example, in the present exemplary embodiment, a case where the three-dimensional shape data editing apparatus 10 which edits the three-dimensional shape data and the three-dimensional modeling apparatus 100 which models the three-dimensional shape based on the three-dimensional shape data are separately provided, is described, but the three-dimensional modeling apparatus 100 may be provided with the function of the editing apparatus 10.

In addition, for example, the editing process of the three-dimensional shape data illustrated in FIG. 5 may be realized by hardware such as application specific integrated circuit (ASIC) or the like. In this case, a processing speed can be increased as compared with the case where the editing process is realized by software.

Further, in each of the exemplary embodiments, a form in which the three-dimensional shape data editing program is installed in the storage unit 20 is described, but the exemplary embodiment is not limited thereto. The three-dimensional shape data editing program according to the present exemplary embodiment also may be provided to be recorded in a computer readable storage medium. For example, which the three-dimensional shape data editing program according to the present exemplary embodiment of the invention may be provided by being recorded on an optical disc such as a compact disc (CD)-ROM, a digital versatile disc (DVD)-ROM, and the like or by being recorded in a semiconductor memory such as a universal serial bus (USB) memory, a memory card, and the like. In addition, the three-dimensional shape data editing program according to the present exemplary embodiment may be obtained from an external device via the communication line connected to the communication unit 18.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A three-dimensional shape data editing apparatus comprising:
    a processor, configured to:
        obtain three-dimensional shape data representing a three-dimensional shape by a set of a plurality of voxels;
        obtain a lamination interval of a three-dimensional modeling apparatus that models the three-dimensional shape;
        determine whether a height of a voxel in a lamination direction of the three-dimensional shape data is different from the lamination interval; and
        in a case where the height of the voxel in the lamination direction of the three-dimensional shape data is different from the lamination interval, edit the three-dimensional shape data so that the three-dimensional shape represented by using the voxel having the height of the lamination interval is similar to an original three-dimensional shape represented by the three-dimensional shape.

2. The three-dimensional shape data editing apparatus according to claim 1,
    wherein the processor edits the three-dimensional shape data so that the lamination intervals are different in a plurality of modeling areas within an identical layer.

3. The three-dimensional shape data editing apparatus according to claim 2,
    wherein each of the plurality of modeling areas is an area corresponding to each of a plurality of different three-dimensional shapes.

4. The three-dimensional shape data editing apparatus according to claim 3,
    wherein the processor edits the three-dimensional shape data so that the lamination intervals are different in a plurality of partial areas within the modeling area.

5. The three-dimensional shape data editing apparatus according to claim 4,
    wherein the processor converts the three-dimensional shape into the plurality of voxels in a state in which the three-dimensional shape is inclined, in a case where the three-dimensional modeling apparatus models the three-dimensional shape in an inclined state.

6. The three-dimensional shape data editing apparatus according to claim 3,
    wherein the processor converts the three-dimensional shape into the plurality of voxels in a state in which the three-dimensional shape is inclined, in a case where the three-dimensional modeling apparatus models the three-dimensional shape in an inclined state.

7. The three-dimensional shape data editing apparatus according to claim 2,
    wherein the processor edits the three-dimensional shape data so that the lamination intervals are different in a plurality of partial areas within the modeling area.

8. The three-dimensional shape data editing apparatus according to claim 7,
    wherein the processor converts the three-dimensional shape into the plurality of voxels in a state in which the three-dimensional shape is inclined, in a case where the three-dimensional modeling apparatus models the three-dimensional shape in an inclined state.

9. The three-dimensional shape data editing apparatus according to claim 2,
    wherein the processor converts the three-dimensional shape into the plurality of voxels in a state in which the three-dimensional shape is inclined, in a case where the three-dimensional modeling apparatus models the three-dimensional shape in an inclined state.

10. The three-dimensional shape data editing apparatus according to claim 2, wherein the processor edits the three-dimensional shape data so that as a tilt angle decreases, the height of the voxel in the lamination direction decreases, in an inclined portion of the three-dimensional shape.

11. The three-dimensional shape data editing apparatus according to claim 1,
wherein the processor converts the three-dimensional shape into the plurality of voxels in a state in which the three-dimensional shape is inclined, in a case where the three-dimensional modeling apparatus models the three-dimensional shape in an inclined state.

12. The three-dimensional shape data editing apparatus according to claim 1,
wherein the processor edits the three-dimensional shape data so that as a tilt angle decreases, the height of the voxel in the lamination direction decreases, in an inclined portion of the three-dimensional shape.

13. The three-dimensional shape data editing apparatus according to claim 1,
wherein the processor edits the three-dimensional shape data so that the lamination interval of an external area of the three-dimensional shape is different from the lamination interval of an internal area of the three-dimensional shape.

14. The three-dimensional shape data editing apparatus according to claim 13,
wherein the processor edits the three-dimensional shape data so that the lamination interval of the external area of the three-dimensional shape is smaller than the lamination interval of the internal area of the three-dimensional shape.

15. The three-dimensional shape data editing apparatus according to claim 14,
wherein the processor edits the three-dimensional shape data so that the lamination interval of a predetermined area required to have a smooth shape in the external area is smaller than the lamination interval of an area other than the predetermined area.

16. The three-dimensional shape data editing apparatus according to claim 1,
wherein the processor edits the three-dimensional shape data and support material data of a support material that supports the three-dimensional shape, so that a lamination interval of the support material is larger than the lamination interval of the three-dimensional shape.

17. The three-dimensional shape data editing apparatus according to claim 16,
wherein the processor edits the support material data so that a shape of the support material of a portion in contact with the three-dimensional shape is smaller than an area of a portion not in contact with the three-dimensional shape.

18. A three-dimensional modeling apparatus comprising:
a controller, configured to:
model a three-dimensional shape based on three-dimensional shape data edited by the three-dimensional shape data editing apparatus according to claim 1.

19. A three-dimensional modeling system comprising:
a three-dimensional shape data editing apparatus comprising a processor configured to:
obtain three-dimensional shape data representing a three-dimensional shape by a set of a plurality of voxels;
obtain a lamination interval of a three-dimensional modeling apparatus that models the three-dimensional shape;
determine whether a height of a voxel in a lamination direction of the three-dimensional shape data is different from the lamination interval; and
in a case where the height of the voxel in the lamination direction of the three-dimensional shape data is different from the lamination interval, edit the three-dimensional shape data so that the three-dimensional shape represented by using the voxel having the height of the lamination interval is similar to an original three-dimensional shape represented by the three-dimensional shape; and
the three-dimensional modeling apparatus comprising a controller that models the three-dimensional shape based on the three-dimensional shape data edited by the three-dimensional shape data editing apparatus.

20. A non-transitory computer readable medium storing a three-dimensional shape data editing program causing a computer to function as the processor of the three-dimensional shape data editing apparatus according to claim 1.

* * * * *